(12) United States Patent
Kratoska (10) Patent No.: US 11,073,175 B2
(45) Date of Patent: Jul. 27, 2021

(54) CAPTIVE SCREW DEVICE

(71) Applicant: GYRUS ACMI, INC., Southborough, MA (US)

(72) Inventor: William Kratoska, Plymouth, MN (US)

(73) Assignee: Gyrus Acmi, Inc., Westborough, MA (US)

(*) Notice: Subject to any disclaimer, the term of this patent is extended or adjusted under 35 U.S.C. 154(b) by 42 days.

(21) Appl. No.: 16/700,300

(22) Filed: Dec. 2, 2019

(65) Prior Publication Data

US 2020/0182282 A1 Jun. 11, 2020

Related U.S. Application Data

(63) Continuation of application No. 15/073,693, filed on Mar. 18, 2016, now Pat. No. 10,520,004.

(51) Int. Cl.
*F16B 35/00* (2006.01)
*F16B 7/14* (2006.01)

(52) U.S. Cl.
CPC .......... *F16B 35/005* (2013.01); *F16B 7/1472* (2013.01); *F16B 35/00* (2013.01); *Y10T 29/49948* (2015.01); *Y10T 29/49963* (2015.01); *Y10T 29/49964* (2015.01)

(58) Field of Classification Search
CPC ...... F16B 35/00; F16B 35/005; F16B 7/1472; Y10T 29/49948; Y10T 29/49964; Y10T 29/49963
See application file for complete search history.

(56) References Cited

U.S. PATENT DOCUMENTS

| | | | | |
|---|---|---|---|---|
| 3,606,393 A | * | 9/1971 | Huntsinger et al. | F16L 25/065 285/90 |
| 3,741,067 A | * | 6/1973 | Moran | F16B 37/043 411/39 |
| 4,895,469 A | * | 1/1990 | Coueron | F16B 21/186 403/21 |
| 5,967,725 A | * | 10/1999 | Voges | F16B 35/00 411/302 |
| 6,322,273 B1 | * | 11/2001 | Gentile, Jr. | F16L 25/065 403/2 |
| 7,008,428 B2 | * | 3/2006 | Cachia | A61B 17/68 606/326 |
| 7,465,137 B2 | * | 12/2008 | Dietz | F16B 35/044 411/386 |

(Continued)

*Primary Examiner* — Bayan Salone
(74) *Attorney, Agent, or Firm* — Schwegman Lundberg & Woessner, P.A.

(57) ABSTRACT

An apparatus is presented comprising a captive screw comprising an upper portion, an upper middle portion, a central middle portion, a lower middle portion, and a lower portion, the central middle portion comprising a threaded portion, the lower portion comprising a barbed portion, the upper middle portion and the lower middle portion comprising a smooth portion, and the upper portion comprising a grip portion, wherein an outer circumference of the barbed portion is flexible, wherein the captive screw is configured with a first attachment portion and a second attachment portion to attach to a first member of an auxiliary device, and wherein the captive screw is configured to act as a set screw with respect to a second member of an auxiliary device.

17 Claims, 3 Drawing Sheets

(56) References Cited

U.S. PATENT DOCUMENTS

| | | | | |
|---|---|---|---|---|
| 7,484,775 | B2* | 2/2009 | Kennedy, Jr. | F16L 21/04 |
| | | | | 285/337 |
| 7,516,991 | B1* | 4/2009 | Cheng | F16B 7/1472 |
| | | | | 285/404 |
| 7,530,775 | B2* | 5/2009 | Jaconelli | B60R 21/213 |
| | | | | 411/302 |
| 7,950,887 | B2* | 5/2011 | Dietz | F16B 35/044 |
| | | | | 411/386 |
| 8,961,091 | B2* | 2/2015 | Prest | B21K 1/46 |
| | | | | 411/424 |
| 9,872,712 | B2* | 1/2018 | Trieu | A61B 17/8685 |
| 2005/0141985 | A1* | 6/2005 | Keller | F16B 35/005 |
| | | | | 411/393 |
| 2013/0330148 | A1* | 12/2013 | Cosenza | F16B 41/002 |
| | | | | 411/353 |
| 2013/0333165 | A1* | 12/2013 | Prest | B21K 1/56 |
| | | | | 24/381 |
| 2015/0223847 | A1* | 8/2015 | Trieu | A61B 17/8685 |
| | | | | 606/246 |

* cited by examiner

CAPTIVE SCREW DEVICE

CROSS-REFERENCE TO RELATED APPLICATION

This application is a continuation of U.S. patent application Ser. No. 15/073,693, filed Mar. 18, 2016, now issued as U.S. Pat. No. 10,524,004, the contents of which are incorporated herein by reference in their entirety.

FIELD OF THE INVENTION

The present invention relates to securing devices, and more particularly relates to an apparatus and method for a captive screw.

BACKGROUND

Captive screws or captive fasteners are typically designed for permanent hold or captivation within a target assembly or housing, including upon servicing. They can provide a secure joining, and avoid fastener loss or damage that might be caused by a loose part. Typical captive screws may be made with thread locking, press-fitting, or broaching to accomplish an anchor-hold within a larger assembly housing. A captive fastener may also be fused with the material into which it is joined, either through cold forming or welding.

Typical captive fasteners are captured by a first body and engage with a second body. U.S. Patent Application No. 20150223847 discloses a fixation screw for implantation in a body comprising different fastening mechanisms. Typical captive fasteners are limited in that they are not removeably attached to a first body and provide releasable fixation with respect to a second body.

In certain mechanical configurations, it may be desirable to have a captive fastener which may be permanently attached and removeably attached to a first member while engaging with a second member. It may be desirable to have a captive fastener which can act as a set screw with respect to a second member in addition to captively fastening to a first member. It may be desirable to have a captive fastener which has a flexible or rigid barb member for causing permanent attachment and a threaded portion for causing removable attachment to the first member. It may be desirable to have a captive screw which allows for longitudinal and rotational motion between a first member and a second member and is capable of locking the first member with respect to the second member.

The device of the present invention overcomes limitations of the prior art in that a captive screw is provided which is capable of repeatedly and easily being driven in and out between a first surface and a second surface of a channel in a first member to adjust longitudinal and rotation position of a first member with respect to a second member, and is prevented from fully disengaging from the first member during repositioning of the first member with respect to the second member.

SUMMARY OF THE INVENTION

The present invention meets one or more of the above needs by providing a screw connector with a barbed section on one end which prevents removal after placement. The present invention meets one or more of the above needs by providing a screw which may incorporate use of barbs for fastening which cannot be withdrawn from a second surface of a channel after insertion through that channel. The present invention meets one or more of the above needs by providing an expandable anchor to hold a medical device in position and which is not removable after placement. The present invention meets one or more of the above needs by providing a threaded portion in a central region of a captive screw for adjusting the friction between a first member and a second member to limit or encourage rotational and longitudinal motion between the first member and the second member.

Accordingly, pursuant to one aspect of the present invention, there is contemplated an apparatus, comprising a captive screw, comprising an upper portion, an upper middle portion, a central middle portion, a lower middle portion, and a lower portion, the central middle portion comprising a threaded portion the lower portion comprising a barbed portion, the upper middle portion and the lower middle portion comprising a smooth portion, and the upper portion comprising a grip portion, wherein an outer circumference of the barbed portion is flexible, wherein the captive screw is configured with a first attachment portion and a second attachment portion to attach to a first member of an auxiliary device, and wherein the captive screw is configured to act as a set screw with respect to a second member of an auxiliary device.

The invention may be further characterized by one or any combination of the features described herein, such as the first attachment portion and the threaded portion are one and the same, the second attachment portion and the barbed portion are one and the same, the first attachment portion is capable of being removeably attached to the first member following insertion into the first member, the second attachment portion is permanently attached to the first member following insertion into the first member, the grip portion comprises a set of parallel etched lines formed in an outer surface of the upper portion.

Pursuant to another aspect of the present invention, there is contemplated an apparatus, comprising a captive screw, comprising an upper portion, a middle portion, and a lower portion, the middle portion comprising an attachment portion configured for removeably attaching the captive screw to a first member of an auxiliary device, the lower portion comprising an attachment portion configured for permanently attaching to the first member of the auxiliary device, and the upper portion comprising a grip portion.

Pursuant to yet another aspect of the present invention, there is contemplated a method, comprising inserting the captive screw of claim 1 into the first member of the auxiliary device, inserting the second attachment portion through a channel in the first member, wherein the second attachment portion prevents removal of the captive screw from the channel after insertion.

The invention may be further characterized by one or any combination of the features described herein, such as adjusting the longitudinal position, the rotational position, or both of the first member with respect to the second member of the auxiliary device, adjusting the depth of the first attachment portion in the first member and tightening the captive screw against the second member through rotation of the grip member such that the captive screw acts as a set screw.

Further aspects, advantages and areas of applicability will become apparent from the description provided herein. It should be understood that the description and specific examples are intended for purposes of illustration only and are not intended to limit the scope of the present disclosure.

DESCRIPTION OF THE DRAWINGS

The drawings described herein are for illustration purposes only and are not intended to limit the scope of the present disclosure in any way.

DETAILED DESCRIPTION OF THE INVENTION

The following description is merely exemplary in nature and is not intended to limit the present disclosure, application, or uses.

As will be seen, the devices and methods taught herein offer a securing device which may be used as a captive screw. The present invention describes a device and method for a securing device which can be repeatedly tightened and loosened, extended and withdrawn within a first member of an auxiliary device for switching between a locked down configuration and a freely movable configuration of a first member with respect to a second member of an auxiliary device and is also capable of being permanently engaged within a first member, thereby preventing unintended or undesired removal thereof.

Figure 1:
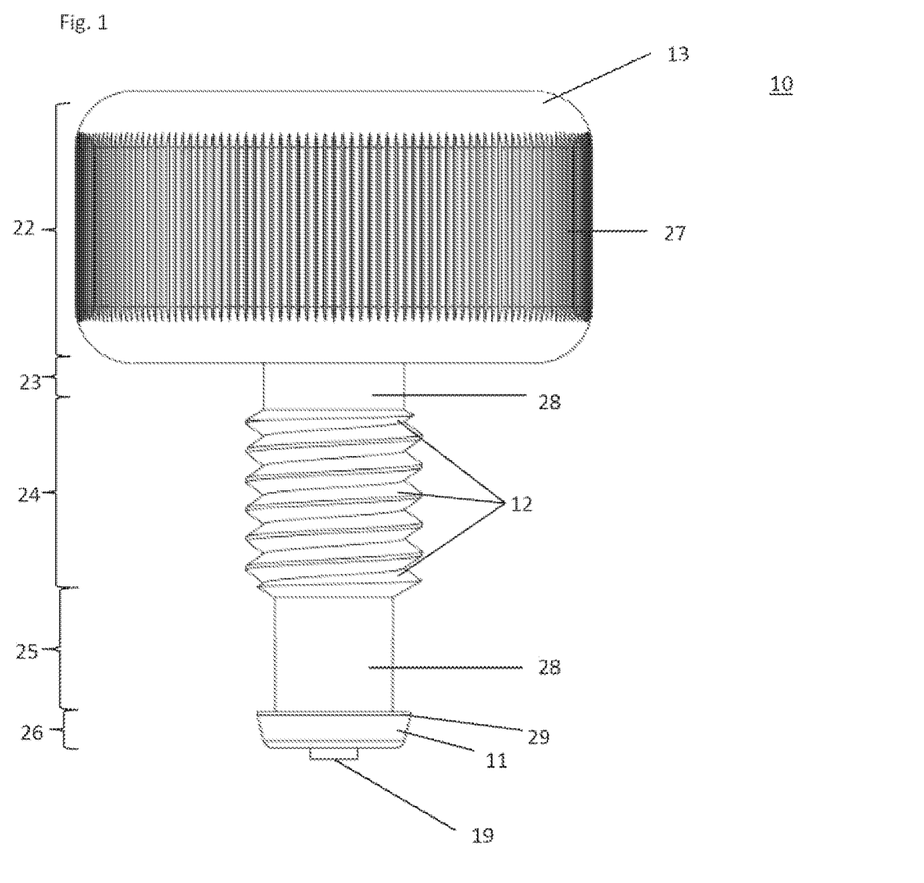
FIG. 1 is a side view of one embodiment of the device of the present invention.

Turning to the drawings to illustrate examples of embodiments of the present teachings, FIG. 1 details a side view of captive screw 10 and details male threads 12 in an outside surface of a central middle portion 24 of captive screw 10. Smooth portions 28 are shown in both upper middle portion 23 and lower middle portion 25 of captive screw 10, and represent areas devoid of threaded engagement. Barbed portion 11 is illustrated on lower portion 26 of captive screw 10 with a flexible or rigid portion 29 near distal tip 19 of captive screw 10. Grip 27 is shown on screw head 13 located at upper portion 22 of captive screw 10.

Figure 2:
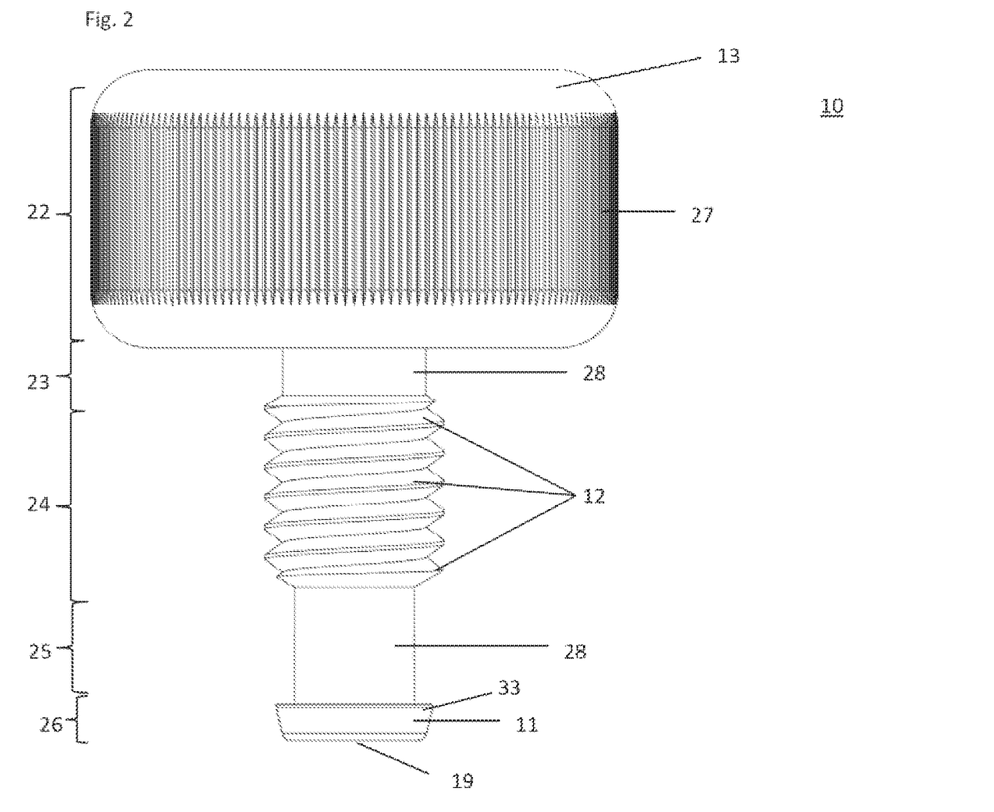
FIG. 2 is a side view of one embodiment of the device of the present invention with a wider base at the distal end.

FIG. 2 details a side view of captive screw 10, similar to that shown in FIG. 1 with the difference being a wide cupped tip distal end 19 and rigid barb portion 33.

Figure 3:
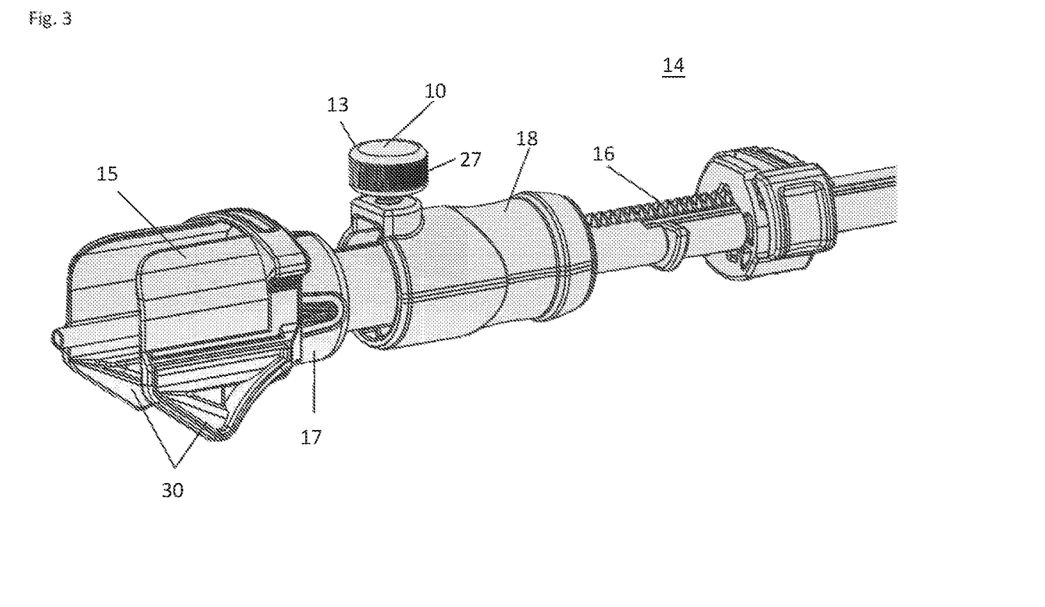
FIG. 3 is a perspective view of one embodiment where the device of the present invention is functionally engaged with a medical device.

FIG. 3 illustrates captive screw 10 engaged in an auxiliary device for creating permanent fixation with a first member and removable fixation with a second member. Captive screw 10 is inserted into a channel in sheath adjuster 18 and comes into contact at a distal end with sheath guide 17. Captive screw 10 acts as a set screw to limit rotational and longitudinal movement of sheath adjuster 18 with respect to sheath guide 17. Coupling 15 is shown which connects to an endoscope or bronchoscope during a surgical procedure using an endobronchical ultrasound device, for example.

Figure 4:
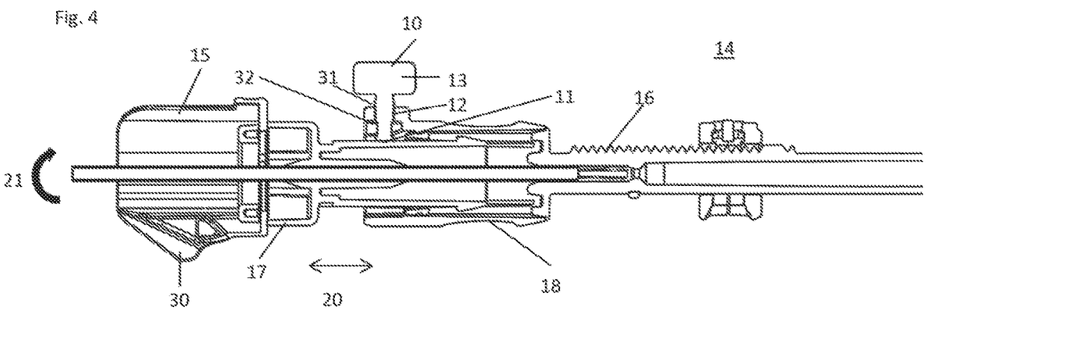
FIG. 4 is cross sectional view of device of the present invention as depicted in FIG. 3.

FIG. 4 illustrates a cross sectional view of the device of FIG. 3 and provides visibility of male screw threads 12 engaged with the female screw threads of a channel of sheath adjuster 18, a component in an auxiliary device. Engagement of distal tip 19 of captive screw 10 with second member, sheath guide 17 can be clearly visualized here. Longitudinal movement 20 of sheath adjuster 18 allows for movement of rail 16 to adjust for different endoscope length or patient size. Coupling 15 provides engagement with an endoscope.

Captive Screw

Functionally, the captive screw fastener of the present invention is capable of being both permanently attached and removeably attached to a first member while also providing engagement with a second member. The captive screw fastener of the present invention can act as a set screw with respect to a second member in addition to captively fastening to a first member. The captive screw of the present invention allows for longitudinal and rotational motion between a first member and a second member of an auxiliary device and is capable of locking the first member with respect to the second member. Captive screw is provided which is capable of repeatedly and easily being driven in and out between a first surface and a second surface of a channel in a first member to adjust longitudinal and rotation position of a first member with respect to a second member, and is prevented from fully disengaging from the first member during repositioning of the first member with respect to the second member.

Structurally, the captive screw fastener of the present invention has a flexible barb member or rigid, fixed barb member for causing permanent attachment and a threaded portion for causing removable attachment to the first member. It is contemplated that certain regions of the captive screw may include a threaded portion and certain portions may have a smooth surface. Depending on the particular application, it may be desirable to have a length of screw threads which extend between an upper central portion, though a central portion, to a lower central portion, or it may be desirable to have the screw thread extend along a subset of these regions. It is contemplated that angle, lead, pitch, major diameter, minor diameter, pitch diameter, thread depth, thread gender (male threads vs. female threads), may be adjusted for a particular purpose. It is contemplated that the device of the present invention could be adapted to fit certain standards, such as ISO (International Organization for Standardization), UTS (Unified Thread Standard), UNC (Unified Coarse), UNF (Unified fine), UNEF (Unified Extra Fine), or UNS (Unified Special), Society Thread, BA (British Association) screw thread, for example.

First Attachment Portion

Functionally, a first attachment portion is provided for securing captive screw 10 within an auxiliary device. The first attachment portion may provide removable attachment to an auxiliary device. The first attachment portion may facilitate movement of captive screw 10 from a partially inserted state to a fully inserted state and at various points there between.

Structurally, the first attachment portion may be a section of thread, corkscrew thread, helical thread, male thread, female thread, helical structure used to convert between rotational and linear movement or force, ridge wrapped around a cylinder, or the like on an outer surface of captive screw 10. The first attachment portion may be bendable, flexible, moldable, shapeable, deflectable, or the like. Alternatively, the first attachment portion may be a fixed, rigid section of thread. The first attachment portion may be located on upper portion 22, upper middle portion 23, central middle portion 24, lower middle portion 25, or lower portion 26 of captive screw 10, or extend across one or more sections of captive screw 10. For example, the first attachment portion may extend across the upper middle portion 23, central middle portion 24, and lower middle portion 25.

Second Attachment Portion

Functionally, a second attachment portion is provided on captive screw 10 in order to provide permanent attachment of captive screw 10 in a channel of an auxiliary device. The second attachment portion may be bendable, flexible, moldable, shapeable, deflectable, or the like, in order to accomplish fitting down a narrow passageway.

Structurally, the second attachment portion may be a flexible member, barb, or the like which is capable of fitting through a narrow channel. Alternatively, the second attachment portion may be a rigid, fixed attachment member which is configured to fit down a narrow channel and maintain fixation in the channel. The second attachment portion may be capable of forming a first expanded configuration and a second contracted configuration. The second attachment portion may form the second contracted configuration during insertion through a first surface of a channel. The second attachment portion may form the first expanded configuration after exiting out of a second surface of a channel. The second attachment portion may allow for captive screw 10 to be permanently attached to an auxiliary device after deployment of the second attachment portion into the first expanded configuration.

Distal Tip

Functionally, distal tip 19 engages with a second member to provide a frictional limitation between a first member and a second member for locking down motion of the first member with respect to the second member.

Structurally, distal tip 19 may be configured with a flat nub end or may configured with a cupped tip end.

Coupling

Functionally, coupling 15 attaches to sheath guide 17 fixedly and facilitates positioning of an endoscope or bronchoscope during use in a medical procedure. When sheath guide 17 is moved rotationally or longitudinally with respect to sheath adjuster 18, coupling 15 moves as sheath guide 17 moves.

Structurally, coupling 15 is provided with wings 30, and a hollow center for stabilization of an EBUS needle device, or other auxiliary device, relative to an endoscope.

Captive Screw in Use in Auxiliary Device

Functionally, in the configuration of FIGS. 3-4, it is imperative that captive screw 10 cannot fasten to sheath guide 17 because the alignment could be any angle or linear displacement. In this configuration, sheath adjuster 18 and sheath guide 17 can move longitudinally or rotationally with respect to each other. Captive screw 10 when tightened down by turning screw head 13 using grip 27, turns screw threads 12 to move captive screw up and down between the first surface 31 and second surface 32 of sheath adjuster 18.

Structurally, FIG. 3 illustrates captive screw 10 of the present invention in use in an endobronchical ultrasound (EBUS) device 14. When captive screw 10 is loosened, sheath guide 17 can telescope in and out. In the embodiment illustrated in FIGS. 3-4, sheath guide 17 is positioned some distance away from sheath adjuster 18. Sheath adjuster 18 can rotate about sheath guide 17 and rails 16. Once captive screw 10 is tightened, the longitudinal motion 20 of the sheath guide and the rotation motion 21 of the sheath adjuster with respect to sheath guide are locked down. When captive screw 10 is tightened, captive screw 10 may act as a set screw with respect to sheath guide 17.

Sheath Guide

Functionally, sheath guide 17 telescopes in and out of sheath adjuster 18. A user may desire to adjust the longitudinal or rotational position of sheath guide 17 with respect to sheath adjuster 18 in order to compensate for variations in the length of different endoscopes or bronchoscopes that would work with the auxiliary device 14. A user may also desire to adjust the longitudinal or rotation position of sheath guide 17 with respect to sheath adjuster 18 in order to compensate for variations in size of bronchial anatomy of different patients (i.e. varying airway length or overall lung size).

Structurally, sheath guide 17 comprises a region of larger circumference and a region of smaller circumference. The region of smaller circumference is capable of being inserted into sheath adjuster 18 and capable of receiving pressure from distal end 19 of captive screw 10 as captive screw is tightened down upon an outer surface of the region of smaller circumference to limit rotational and longitudinal motion between sheath guide 17 and sheath adjuster 18. It is contemplated that captive screw 10 could be equivalently used to lock rotational and longitudinal motion between any two components.

Sheath Adjuster

Functionally, sheath adjuster 18 works with sheath guide 17 to telescope in and out to create longitudinal and rotational motion between the two components. A user may desire to adjust the longitudinal position of sheath guide 17 with respect to sheath adjuster 18 in order to compensate for variations in the length of different endoscopes or bronchoscopes that would work with the auxiliary device 14. A user may also desire to adjust the longitudinal position of sheath guide 17 with respect to sheath adjuster 18 in order to compensate for variations in size of bronchial anatomy of different patients (i.e. varying airway length or overall lung size). A user may desire to adjust the rotational position of sheath guide 17 for the convenience and comfort of a user's hand during a surgical procedure. A user may desire to adjust the rotational position of sheath guide 17 so that a user does not have to reach around in an awkward position in order to make fine longitudinal adjustments.

Structurally, sheath adjuster 18 has a channel therethrough for insertion of captive screw 10. The channel has an upper portion 31 and a lower portion 32. The channel is mechanically structured such that captive screw 10 can fit therethrough. Specifically, a second attachment portion, flexible member, barb, or the like can fit through the channel of sheath adjuster 18. Once the second attachment portion of captive screw 10 reaches beyond the lower portion 32 of the channel, captive screw 10 is permanently attached to sheath adjuster 18. The channel may be configured with threads to receive screw threads 12 of captive screw 10.

As to all of the foregoing general teachings, as used herein, unless otherwise stated, the teachings envision that any member of a genus (list) may be excluded from the genus; and/or any member of a Markush grouping may be excluded from the grouping.

Unless otherwise states, all ranges include both endpoints and all numbers between the endpoints. The use of "about" and "approximately" in connection with a range applies to both ends of the range. Thus, "about 20 to 30" is intended to cover "about 20 to about 30," inclusive of at least the specified endpoints.

The disclosures of all articles and references, included patent applications and publications, are incorporated by reference for all purposes. The term "consisting essentially of" to describe a combination shall include elements, ingredients, components or steps identified, and such other elements, ingredients, components or steps that do not materially affect the basic and novel characteristics of the combination. The use of the terms "comprising" or "including" to describe combinations of elements, ingredients, components, or steps herein also contemplates embodiments that consist essentially of, or even consist of the elements, ingredients, components or steps. Plural elements, ingredients, components, or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, components or step is not intended to foreclose additional elements, ingredients, components, or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, included patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

10 Captive Screw
11 Barbed portion
12 Threaded portion
13 Screw head
14 EBUS needle
15 Coupling
16 Rail
17 Sheath guide
18 Sheath Adjuster
19 Distal tip of screw
20 Longitudinal motion
21 Rotational motion
22 Upper portion
23 Upper middle portion
24 Central middle portion
25 Lower middle portion
26 Lower portion
27 Grip
28 Smooth portion
29 Flexible portion of barb
30 Wings
31 First surface of channel of first member
32 Second surface of channel of first member
33 Rigid portion of barb

The invention claimed is:

1. A medical instrument comprising:
an elongate member;
a captive screw, including a screw head proximal end portion; an intermediate threaded portion, and a rigid distal barb portion at a distal end of the captive screw;
an adjuster, including a passage sized and shaped to accommodate a portion of the elongate member, and to permit at least one of rotation or longitudinal translation of the elongate member with respect to the adjuster, wherein the adjuster includes a threaded bore configured to accommodate threading of the intermediate threaded portion and passage of the rigid distal barb portion of the captive screw; and
wherein the captive screw is configured to be threaded into the threaded bore to secure a position of the elongate member with respect to the adjuster by rotating the captive screw to actuate pressing the distal end of the captive screw against the elongate member.

2. The instrument of claim 1, wherein the elongate member includes a sheath guide and the adjuster includes a sheath adjuster.

3. The instrument of claim 2, wherein the sheath guide and the sheath adjuster are configured for endobronchial use.

4. The instrument of claim 1, wherein the intermediate threaded portion of the captive screw is externally threaded, wherein the threaded bore is internally threaded, and wherein the rigid distal barb protrudes laterally outward from the captive screw.

5. The instrument of claim 4, wherein the rigid distal barb is spaced apart from the intermediate threaded portion of the captive screw by a smooth portion of the captive screw.

6. The instrument of claim 5, wherein the smooth portion of the captive screw does not include a thread or barb.

7. The instrument of claim 4, wherein the rigid distal barb protrudes outward from the captive screw by a like amount as a protrusion of the externally threaded portion of the captive screw.

8. The instrument of claim 1, wherein the rigid distal barb is located beyond a distal end of the threaded bore when a distal end of the captive screw presses against the elongate member.

9. A medical instrument comprising:
an elongate member;
a captive screw, including a screw head proximal end portion, an intermediate portion, and a rigid distal barb portion at a distal end of the captive screw;
an adjuster, including a passage sized and shaped to accommodate a portion of the elongate member, and to permit at least one of rotation or longitudinal translation of the elongate member with respect to the adjuster, wherein the adjuster includes a channel configured to accommodate threading of the intermediate portion and passage of the rigid distal barb portion of the captive screw; and
wherein the captive screw is configured to be inserted into the channel such that the rigid distal barb portion of the captive screw is located beyond the channel to capture the captive screw with respect to the channel, and wherein the captive screw is configured to secure a position of the elongate member with respect to the adjuster by rotating the captive screw for threading and advancing the captive screw for pressing the distal end of the captive screw against the elongate member.

10. The instrument of claim 9, wherein the elongate member includes a sheath guide and the adjuster includes a sheath adjuster.

11. The instrument of claim 10, wherein the sheath guide and the sheath adjuster are configured for endobronchial use.

12. The instrument of claim 9, wherein the intermediate portion of the captive screw is threaded to permit at least one of advancing or retracting the captive screw with respect to the channel, and wherein the rigid distal barb protrudes laterally outward from the captive screw.

13. The instrument of claim 12, wherein the rigid distal barb is spaced apart from the intermediate portion of the captive screw.

14. The instrument of claim 9, w her at east a portion of the channel is threaded.

15. The instrument of claim 14, wherein the channel accommodates passage of the rigid distal barb therethrough.

16. A method of using a medical instrument, the method comprising: inserting at least a portion of a captive screw, the captive screw including a screw head proximal end portion, an intermediate threaded portion, and a rigid distal barb portion at a distal end of the captive screw, into a threaded bore of an adjuster including a passage sized and shaped to accommodate a portion of an elongate member, and to permit at least one of rotation or longitudinal translation of the elongate member with respect to the adjuster;

threading at least a portion of the captive screw into the threaded bore of the adjuster such that the distal barb is located beyond the threaded bore to capture the screw with respect to the adjuster; and securing a position of an elongate member with respect to the adjuster, by rotating the captive screw such that the distal end of the captive screw presses against the elongate member.

17. The method of claim 16, further comprising adjusting at least one of a rotational or longitudinal position of the elongate member with respect to the adjuster before securing the position of the elongate member with respect to the adjuster.

\* \* \* \* \*

UNITED STATES PATENT AND TRADEMARK OFFICE
CERTIFICATE OF CORRECTION

PATENT NO. : 11,073,175 B2
APPLICATION NO. : 16/700300
DATED : July 27, 2021
INVENTOR(S) : William Kratoska It is certified that error appears in the above-identified patent and that said Letters Patent is hereby corrected as shown below:

In the Claims

In Column 7, Line 55, in Claim 1, delete "portion;" and insert --portion,-- therefor In Column 8, Line 61, in Claim 14, delete "w her at east" and insert --wherein at least-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*